(12) United States Patent
Kikuchi

(10) Patent No.: US 8,232,912 B2
(45) Date of Patent: Jul. 31, 2012

(54) OBJECT DETECTING APPARATUS

(75) Inventor: Hayato Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/934,537

(22) PCT Filed: May 7, 2009

(86) PCT No.: PCT/JP2009/058626
§ 371 (c)(1),
(2), (4) Date: Sep. 24, 2010

(87) PCT Pub. No.: WO2009/136621
PCT Pub. Date: Nov. 12, 2009

(65) Prior Publication Data
US 2011/0018755 A1    Jan. 27, 2011

(30) Foreign Application Priority Data

May 9, 2008 (JP) ................................. 2008-123696

(51) Int. Cl.
*G01S 13/00* (2006.01)
(52) U.S. Cl. .............................. 342/70; 342/72; 342/107
(58) Field of Classification Search ................ 342/70–72
See application file for complete search history.

(56) References Cited

U.S. PATENT DOCUMENTS

| | | | |
|---|---|---|---|
| 5,633,642 A | 5/1997 | Höss et al. | |
| 6,072,422 A | 6/2000 | Yamada | |
| 6,140,954 A * | 10/2000 | Sugawara et al. | ............... 342/70 |
| 6,249,243 B1 | 6/2001 | Takagi | |
| 6,369,700 B1 | 4/2002 | Yamada | |
| 2003/0128154 A1 | 7/2003 | Nakanishi et al. | |
| 2005/0174282 A1* | 8/2005 | Nakanishi et al. | ............ 342/109 |
| 2008/0088500 A1 | 4/2008 | Ishii et al. | |

FOREIGN PATENT DOCUMENTS

| | | |
|---|---|---|
| EP | 0 932 052 A2 | 7/1999 |
| EP | 1 477 826 A2 | 11/2004 |
| JP | 11-211811 A | 8/1999 |
| JP | 11-337635 A | 12/1999 |
| JP | 2000-65921 A | 3/2000 |
| JP | 2000-180540 A | 6/2000 |
| JP | 3305624 B2 | 5/2002 |
| JP | 2003-202374 A | 7/2003 |

\* cited by examiner

*Primary Examiner* — Timothy A Brainard
(74) *Attorney, Agent, or Firm* — Arent Fox LLP

(57) ABSTRACT

In an FM/CW type radar device (R), when object candidate information storage means (M5) stores as object candidate information a distance or a relative speed for an object that is determined based on a combination of peak signals on the rising side and the falling side in each detection area, if a difference in frequency between peak signal 1 determined in a given detection area and peak signal 2 determined in another detection area is no greater than a predetermined value and object candidate information due to peak signal 1 and object candidate information due to peak signal 2 stored in the object candidate information storage means (M5) are substantially equal to each other, grouping means (M7) carries out grouping of the two peak signals and, furthermore, object information calculation means (M8) calculates the distance or relative speed for the object based on a combination of peak signals on the rising side and the falling side after the grouping processing. This enables the distance and relative speed of an object to be calculated with good precision by means of an FM/CW type object detecting apparatus while minimizing the amount of arithmetic processing and the processing time.

8 Claims, 15 Drawing Sheets

FIG.11
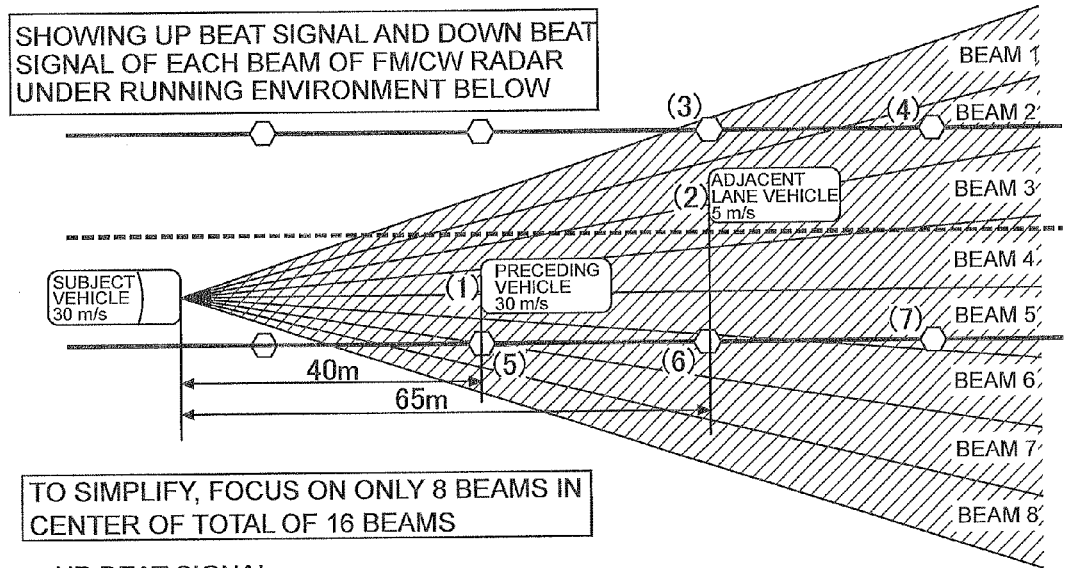
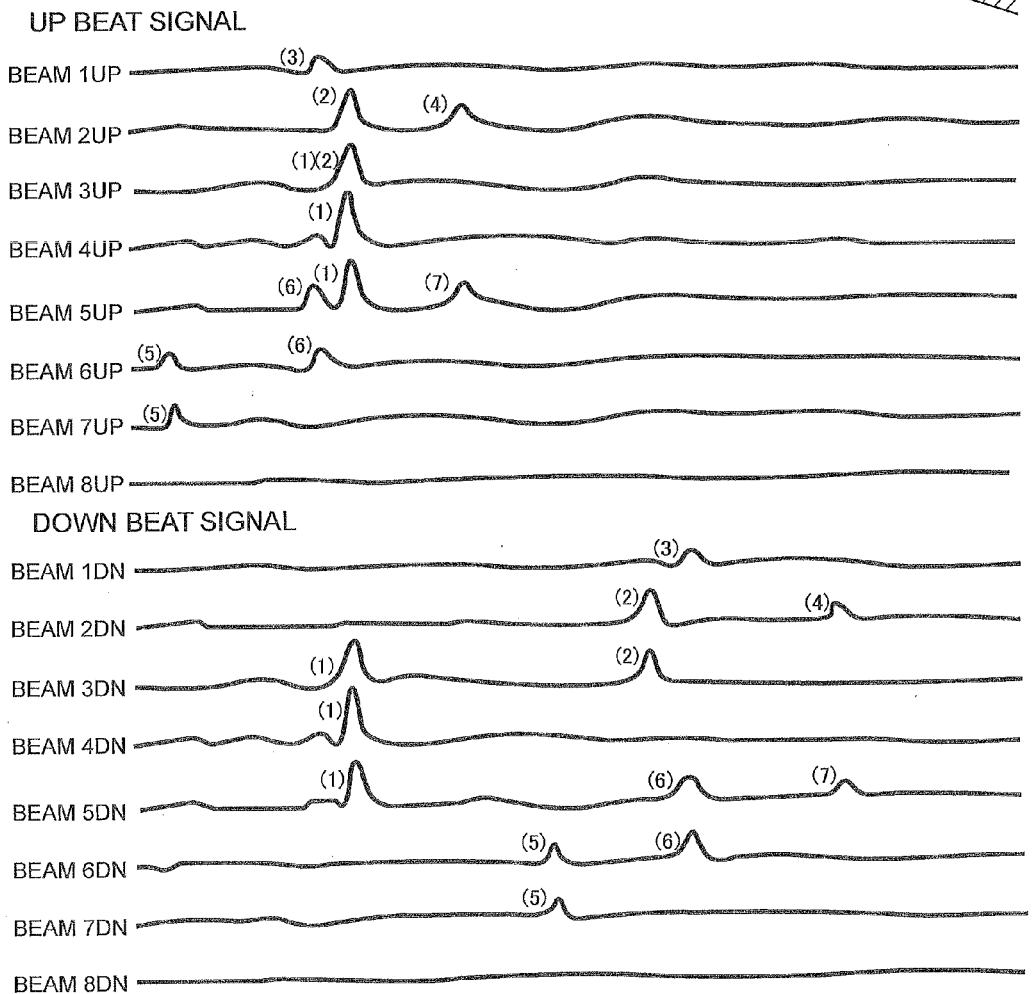

FIG.13

CONVENTIONAL PAIRING METHOD B (FIELD PAIRING)
GROUPING OF UP BEAT SIGNALS AND GROUPING OF
DOWN BEAT SIGNALS ARE CARRIED OUT FIRST,
AND GROUPED TARGETS ARE SUBJECTED TO PAIRING

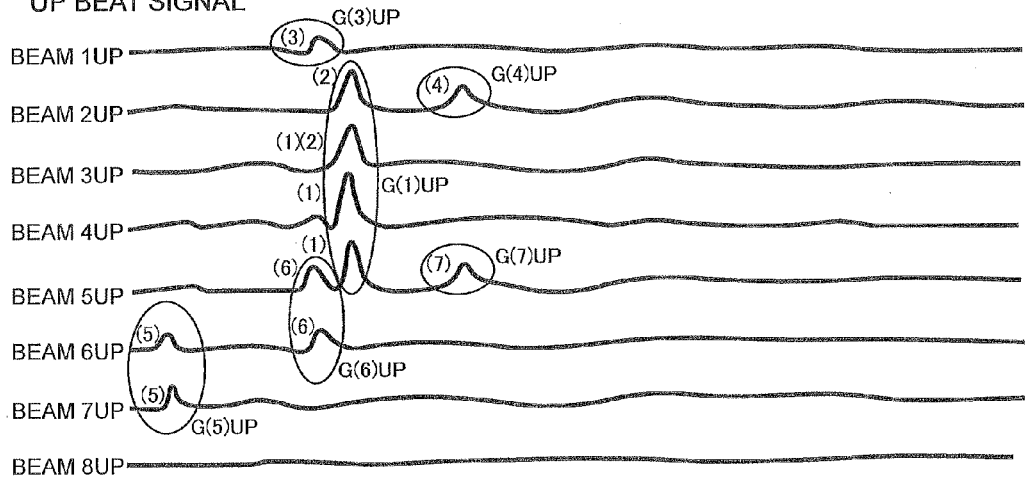

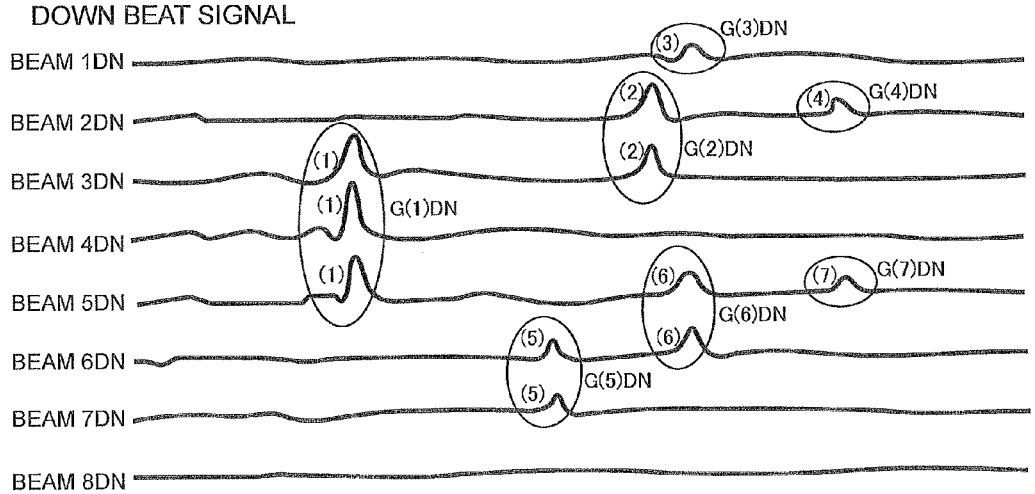

FOR G (3) TO G (7), PAIRING IS EASILY CARRIED OUT BY COMPARING DETECTION ANGLE AND
REFLECTION LEVEL OF GROUP, AND DISTANCE AND RELATIVE SPEED AFTER PAIRING.
BUT UP BEAT G (1) IS A GROUP IN WHICH TARGETS (1) AND (2) ARE BLENDED, PAIRING WITH
DOWN BEAT G (1) IS DONE PREFERENTIALLY, AND PAIRING WITH DOWN BEAT
G (2) CANNOT BE CARRIED OUT.
AS IN CONVENTIONAL PAIRING METHOD A (1 BEAM UNIT PAIRING),
CORRECT PAIRING CANNOT BE CARRIED OUT.

FIG.15

GROUPING OF UP BEAT SIGNALS AND GROUPING OF DOWN BEAT SIGNALS ARE CARRIED OUT FIRST, AND GROUPED TARGETS ARE SUBJECTED TO PAIRING.
WHEN GROUPING, PAIRING CANDIDATE INFORMATION DETERMINED BY 1 BEAM PAIRING IS UTILIZED.

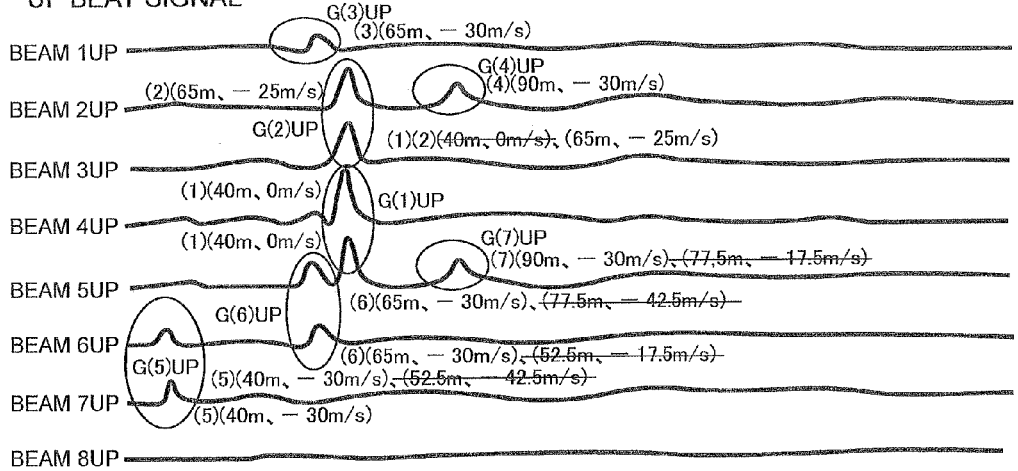

UP BEAT SIGNAL

BY UTILIZING PAIRING CANDIDATE INFORMATION DETERMINED BY 1 BEAM PAIRING,
• IN CONVENTIONAL PAIRING METHOD B, RESULTANT REFLECTED PEAKS OF TARGETS (1) & (2) HAVE SAME FREQUENCY AND ARE COMBINED AS ONE GROUP, BUT IN THE PRESENT INVENTION THEY CAN BE SEPARATED INTO TWO GROUPS.
• AMONG A PLURALITY OF PAIRING CANDIDATES, COMBINATIONS THAT CAN UNDERGO GROUPING PROCESSING ARE DONE PREFERENTIALLY, AND ERRONEOUS COMBINATIONS EXCLUDED.
(SINGLE COMBINATION DETERMINED FROM A PLURALITY OF COMBINATIONS FOR TARGETS (5) TO (7) OF BEAMS 5 TO 7)

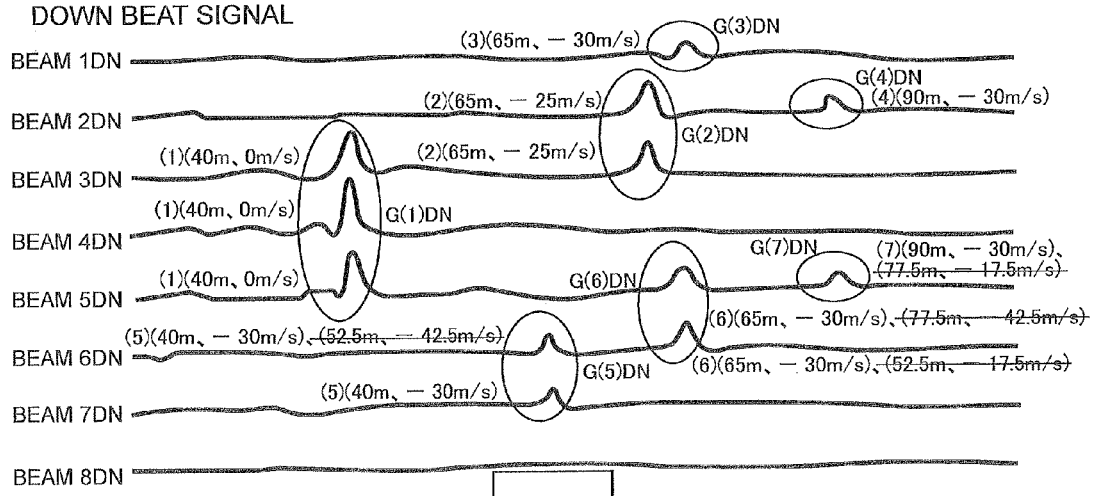

FOR ALL OF G (1) TO G (7), PAIRING IS EASILY CARRIED OUT BY COMPARING DETECTION ANGLE, REFLECTION LEVEL OF GROUP, AND DISTANCE AND RELATIVE SPEED AFTER PAIRING. AS SHOWN IN TABLE 1, DISTANCE AND RELATIVE SPEED OF TARGET CAN BE CALCULATED CORRECTLY.

OBJECT DETECTING APPARATUS

CROSS-REFERENCE TO RELATED APPLICATION

This application is a National Stage entry of International Application No. PCT/JP2009/058626, filed May 7, 2009, which claims priority of Japanese Application No. 2008-123696, filed May 9, 2008. The disclosure of the prior application is hereby incorporated in its entirety by reference.

TECHNICAL FIELD

The present invention relates to an object detecting apparatus for carrying out detection of an object using an FM/CW wave.

BACKGROUND ART

An object detecting apparatus in which an FM/CW wave whose frequency is made to rise and fall in a triangular waveform with time is transmitted, a wave reflected from an object is received, a beat signal obtained by mixing the transmitted signal and the received signal is subjected to frequency analysis, and frequencies on the rising side and the falling side of the reflected peak thus obtained are used to give the distance to the object and the relative speed is known from Patent Document 1 below.

In order to calculate the distance and relative speed of an object by an FM/CW type radar device, it is necessary to combine, of waves reflected from the same object, a reflected peak of an up beat signal and a reflected peak of a down beat signal that correspond to each other (this is called pairing).

However, in the FM/CW type radar device, for example, a fan-shaped detection region having an angle of 16° to the left and to the right is scanned by, for example, 16 beams having a detection area with 1° to the left and to the right, and when an object such as a vehicle is a detection target, a plurality of beams impinge on the object. As a result, reflected waves from one object include a plurality of pairs of up beat signal reflected peak and down beat signal reflected peak, and unless pairing thereof is carried out appropriately, the distance and relative speed of the object cannot be calculated with good precision.

Conventionally, as a pairing method for calculating distance and relative speed of an object using an FM/CW type radar device, a 1 beam pairing method or a field pairing method is employed.

The 1 beam pairing method is one in which pairing is carried out using 1 beam unit having a detection area of 1° to the left and to the right, those having distances and relative speeds that are close are collected together, and the distance and relative speed of one object are calculated.

The field pairing method is one in which those contained in a detection region of 16° to the left and to the right that have up beat signal reflected peak frequency and left-and-right direction angle that are close are collected together, those having down beat signal reflected peak frequency and left-and-right direction angle that are close are collected together, and the frequencies of the reflected peaks of these two collected groups are paired, thus calculating the distance and relative speed of one object.

Patent Document 1: Japanese Patent No. 3305624

DISCLOSURE OF INVENTION

Problems to be Solved by the Invention

However, in the above 1 beam pairing method, in order to determine a correct combination among the plurality of combinations, the amount of data to be arithmetically processed becomes enormous, the processing time becomes long, and not only is there a possibility that the arithmetic processing will not be completed within a predetermined cycle time, but there is also a possibility that, since information of the 1 beam is fragmentary for an object on which a plurality of beams impinge, the pairing partner will be mistaken and the distance and relative speed of the object will be incorrectly calculated.

Furthermore, in the above field pairing method, since there are a plurality of combinations of distance and relative speed corresponding to the frequency of a reflected peak, if a combination of the distance and relative speed of another object coincidentally agrees therewith, there is a possibility that they will be mistakenly determined to be the same object, thus resulting in mistaken pairing.

The present invention has been accomplished in the light of the above-mentioned circumstances, and it is an object thereof to calculate the distance and relative speed of an object with good precision by means of an FM/CW type object detecting apparatus while minimizing the amount of arithmetic processing and the processing time.

Means for Solving the Problems

In order to attain the above object, according to a first aspect of the present invention, there is provided an object detecting apparatus comprising transceiving means that transmits FM/CW waves toward a plurality of detection areas and receives a reflected wave of the transmitted FM/CW wave from an object, frequency analysis means that generates a beat signal from the transmitted wave and the received wave of the transceiving means and subjects the beat signal to frequency analysis, peak signal detection means that determines peak signals on the rising side and the falling side based on the results of the frequency analysis by the frequency analysis means, object candidate information storage means that stores as object candidate information a distance or a relative speed for an object determined based on a combination of peak signals on the rising side and the falling side of each detection area, grouping means that, when the difference in frequency between peak signal 1 determined in any detection area and peak signal 2 determined in another detection area is no greater than a predetermined value and object candidate information due to peak signal 1 stored in the object candidate information storage means is substantially equal to object candidate information due to peak signal 2, groups the two peak signals, and object information calculation means that calculates the distance or relative speed of the object based on a combination of peak signals on the rising side and the falling side after the grouping processing.

Further, according to a second aspect of the present invention, in addition to the first aspect, when there are a plurality of combinations of peak signals on the rising side and the falling side in each detection area, the object candidate information storage means stores as object candidate information a distance or a relative speed for the object determined based on each combination, and when there is common object candidate information between a plurality of sets of object candidate information due to peak signal 1 and a plurality of sets of object candidate information due to peak signal 2 stored in the object candidate information storage means, the grouping means groups the two peak signals.

Furthermore, according to a third aspect of the present invention, in addition to the first or second aspect, when the distance of the object due to peak signal 1 and the distance of the object due to peak signal 2 stored in the object candidate information storage means are substantially equal to each other, the grouping means determines that sets of object information calculated from the two peak signals are equal.

Moreover, according to a fourth aspect of the present invention, in addition to any one of the first to third aspects, when the relative speed due to peak signal 1 and the relative speed due to peak signal 2 stored in the object candidate information storage means are substantially equal to each other, the grouping means determines that sets of object information calculated by the two peak signals are equal.

EFFECTS OF THE INVENTION

In accordance with the first aspect of the present invention, when the object candidate information storage means stores as object candidate information a distance or a relative speed for an object that is determined based on a combination of peak signals on the rising side and the falling side in each detection area, if the difference in frequency between peak signal 1 determined in a given detection area and peak signal 2 determined in another detection area is no greater than a predetermined value and object candidate information due to peak signal 1 and object candidate information due to peak signal 2 stored in the object candidate information storage means are substantially equal to each other, the grouping means carries out grouping of the two peak signals and, furthermore, the object information calculation means calculates the distance or relative speed for the object based on a combination of peak signals on the rising side and the falling side after the grouping processing.

In this way, the object candidate information storage means carries out pairing of peak signals on the rising side and the falling side, but since final calculation of distance or relative speed for an object is not carried out, the amount of arithmetic processing can be reduced; furthermore, since the grouping means carries out grouping based on object candidate information due to peak signals stored in the object candidate information storage means, pairing can be carried out correctly and, as a result, calculation of distance or relative speed for an object by the object information calculation means can be carried out using a small amount of arithmetic processing with good precision.

Furthermore, in accordance with the second aspect of the present invention, since, when there are a plurality of combinations of peak signals on the rising side and the falling side in each detection area, the object candidate information storage means stores as object candidate information a distance or relative speed for an object determined based on each combination, and if there is object candidate information that is common between a plurality of sets of object candidate information due to peak signal 1 and a plurality of sets of object candidate information due to peak signal 2 stored in the object candidate information storage means, the grouping means carries out grouping of the two peak signals, grouping of peak signal 1 and peak signal 2 can be carried out with good precision.

Moreover, in accordance with the third aspect of the present invention, since, when the distance of an object due to peak signal 1 stored in the object candidate information storage means is substantially equal to the distance of the object due to peak signal 2, the grouping means determines that the sets of object information calculated from the two peak signals are equal, grouping based on object information can be carried out with better precision.

Furthermore, in accordance with the fourth aspect of the present invention, since, when the relative speed due to peak signal 1 stored in the object candidate information storage means is substantially equal to the relative speed due to peak signal 2, the grouping means determines that sets of object information calculated from the two peak signals are equal to each other, grouping based on object information can be carried out with better precision.

BRIEF DESCRIPTION OF DRAWINGS

FIG. 11 is a diagram showing the positional relationship between subject vehicle and objects and up beat signal and down beat signal at that time. (first embodiment)

FIG. 13 is a diagram for explaining a conventional field pairing method. (first embodiment)

FIG. 15 is a diagram for explaining the pairing method of the embodiment (second partial diagram). (first embodiment)

EXPLANATION OF REFERENCE NUMERALS AND SYMBOLS

M1 Transceiving means
M3 Frequency analysis means
M4 Peak signal detection means
M5 Object candidate information storage means
M7 Grouping means
M8 Object information calculation means

BEST MODE FOR CARRYING OUT THE INVENTION

A mode for carrying out the present invention is explained below by reference to the attached drawings.

First Embodiment

FIG. 1 to FIG. 15 show a mode for carrying out the present invention.

Figure 1:
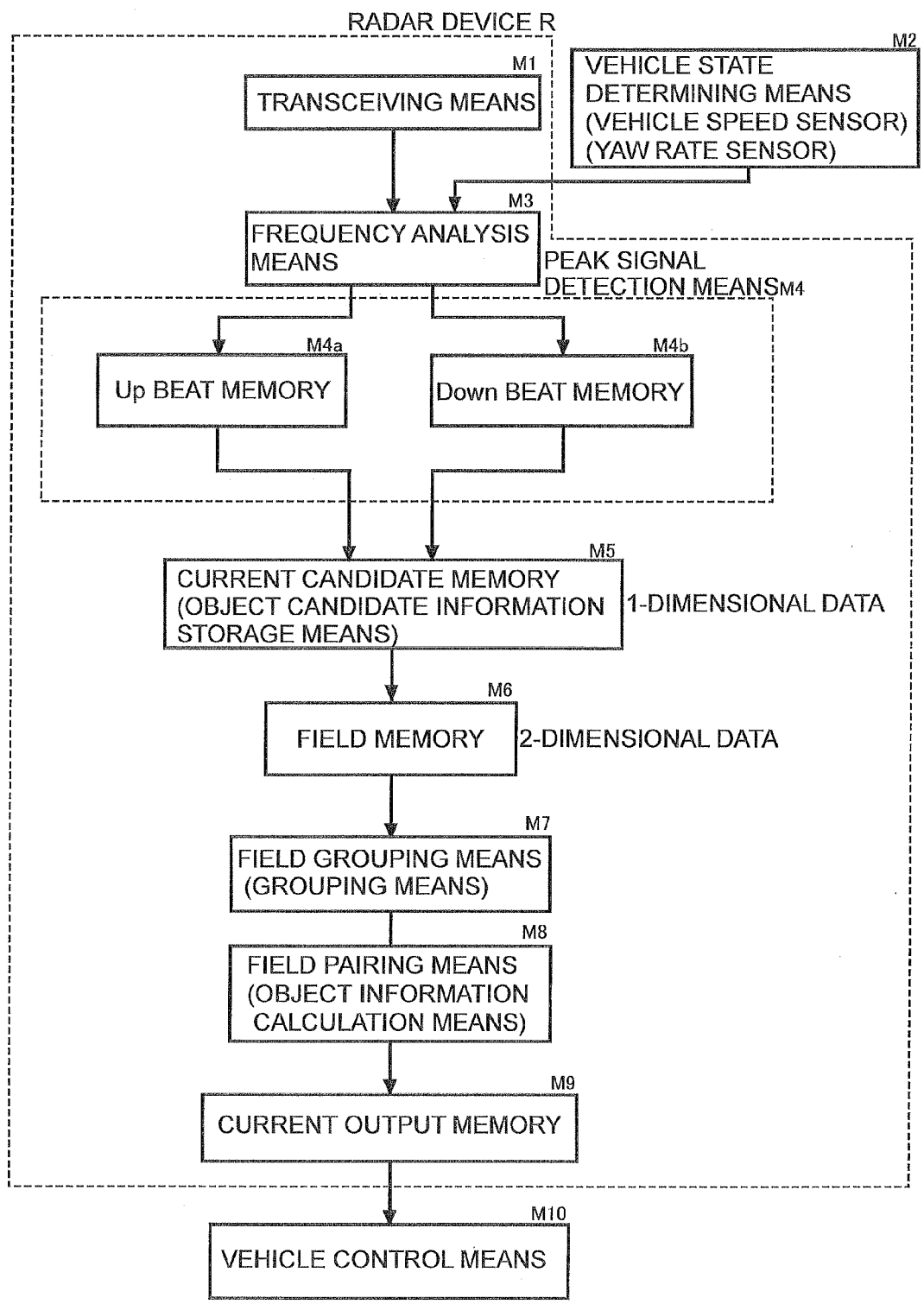
FIG. 1 is a block diagram of a vehicle control system employing an FM/CW type radar device. (first embodiment)
Figure 2:
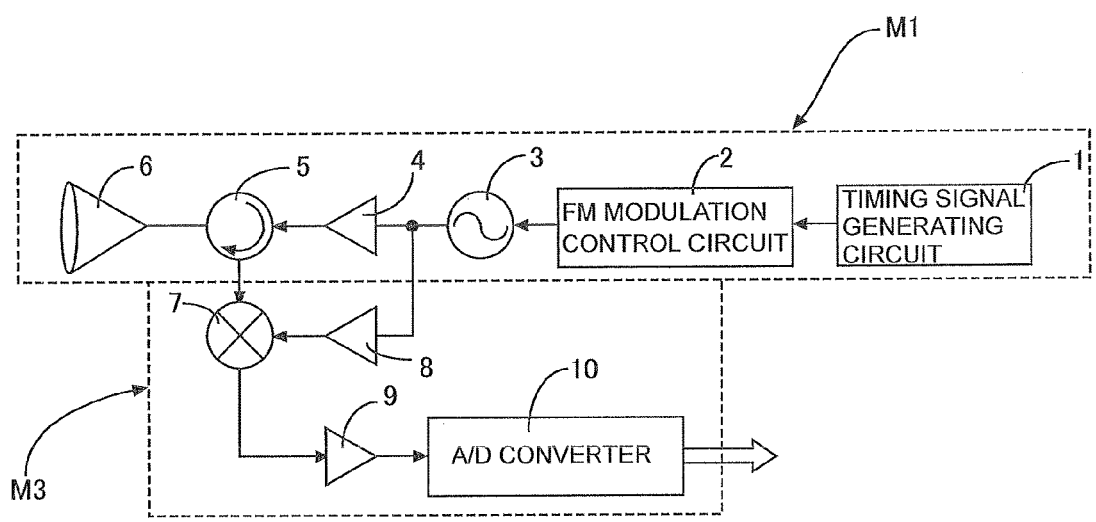
FIG. 2 is a diagram showing the arrangement of transceiving means and frequency analysis means of the radar device. (first embodiment)

As shown in FIG. 1 and FIG. 2, an FM/CW type radar device R includes transceiving means M1, frequency analysis means M3, peak signal detection means M4, current candidate memory (object candidate information storage means) M5, field memory M6, field grouping means (grouping means) M7, field pairing means (object information calculation means) M8, and current output memory M9, the frequency analysis means M3 has vehicle state determining means M2 connected thereto, the vehicle state determining means M2 including a vehicle speed sensor and a yaw rate sensor, and the current output memory M9 has vehicle control means M10 such as an automatic control system connected thereto.

The transceiving means M1 is formed from a timing signal generating circuit 1, an FM modulation control circuit 2, an oscillator 3, an amplifier 4, a circulator 5, and a transceiving antenna 6. Based on a timing signal inputted from the timing signal generating circuit 1, the FM modulation control circuit 2 modulation-controls the oscillation operation of the oscillator 3; as shown by the solid line in FIG. 3 (A) the frequency is modulated into a triangular waveform, a modulated transmitted wave signal from the oscillator 3 is inputted into the transceiving antenna 6 via the amplifier 4 and the circulator 5, and an FM/CW wave is transmitted from the transceiving antenna 6. When an object such as a preceding vehicle is present in front of the transceiving antenna 6, a reflected wave that has been reflected from the object is received by the transceiving antenna 6. This reflected wave, for example, as shown by the broken line in FIG. 3 (A) when an object in front is approaching, appears behind the transmitted wave at a lower frequency than the transmitted wave on the rising side where the transmitted wave increases linearly, and appears behind the transmitted wave at a higher frequency than the transmitted wave on the falling side where the transmitted wave decreases linearly.

Figure 3:
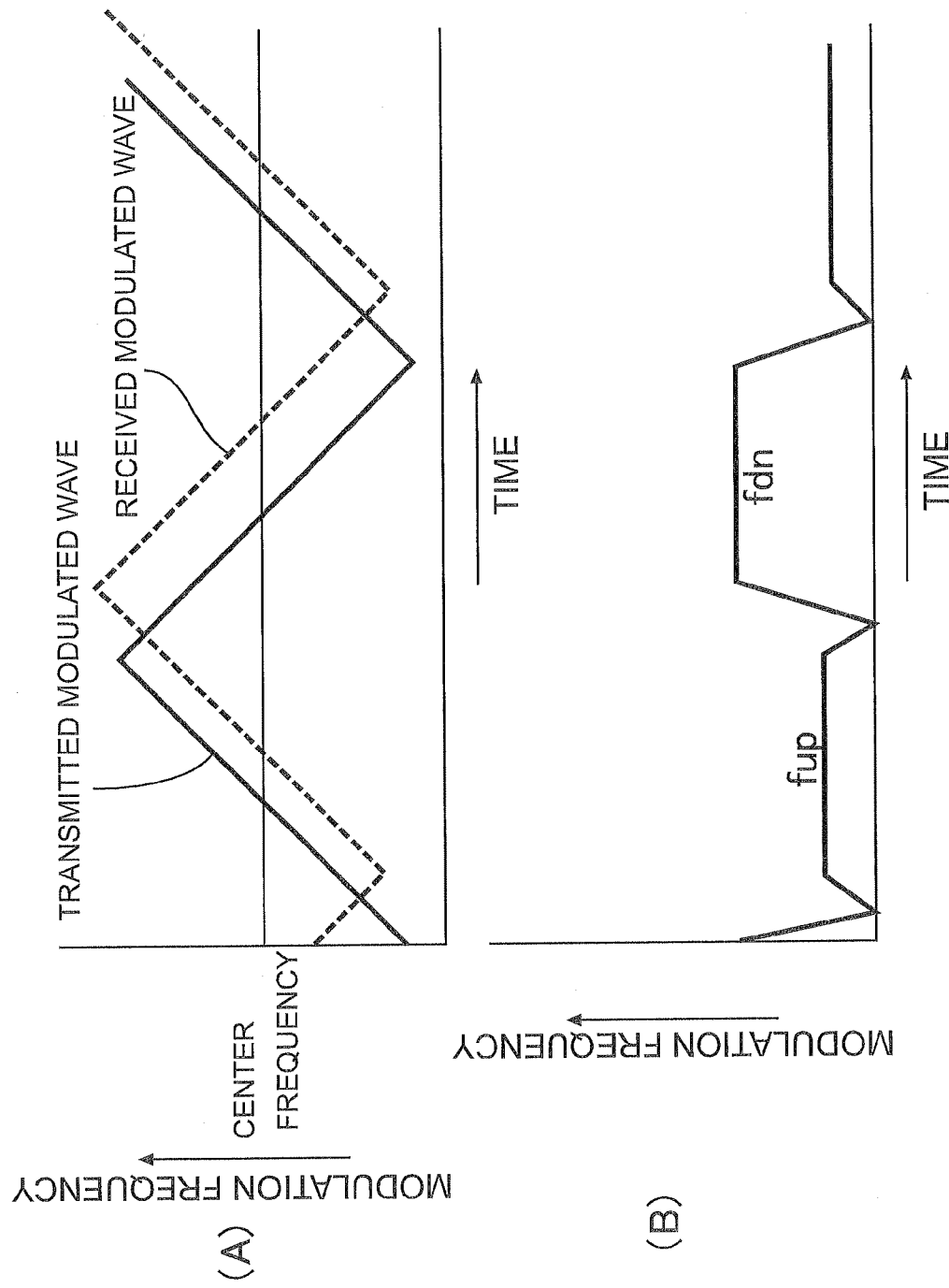
FIG. 3 is a diagram showing waveform and peak frequency of transmitted/received waves when an object is approaching. (first embodiment)

The frequency analysis means M3 is formed from a mixer 7, an amplifier 8, an amplifier 9, and an A/D converter 10. The received wave received by the transceiving antenna 6 is inputted into the mixer 7 via the circulator 5 and, in addition to the received wave from the circulator 5, the transmitted wave signal distributed from the transmitted wave signal outputted from the oscillator 3 is inputted into the mixer 7 via the amplifier 8. The transmitted wave and received wave are mixed in the mixer 7, and as shown in FIG. 3 (B) a beat signal having a peak frequency fup on the rising side where the transmitted wave increases linearly and a peak frequency fdn on the falling side where the transmitted wave decreases linearly is therefore generated. The beat signal obtained in the mixer 7 is amplified by the amplifier 9 so as to have a necessary amplitude level, and then A/D-converted by the A/D converter 10.

Figure 4:
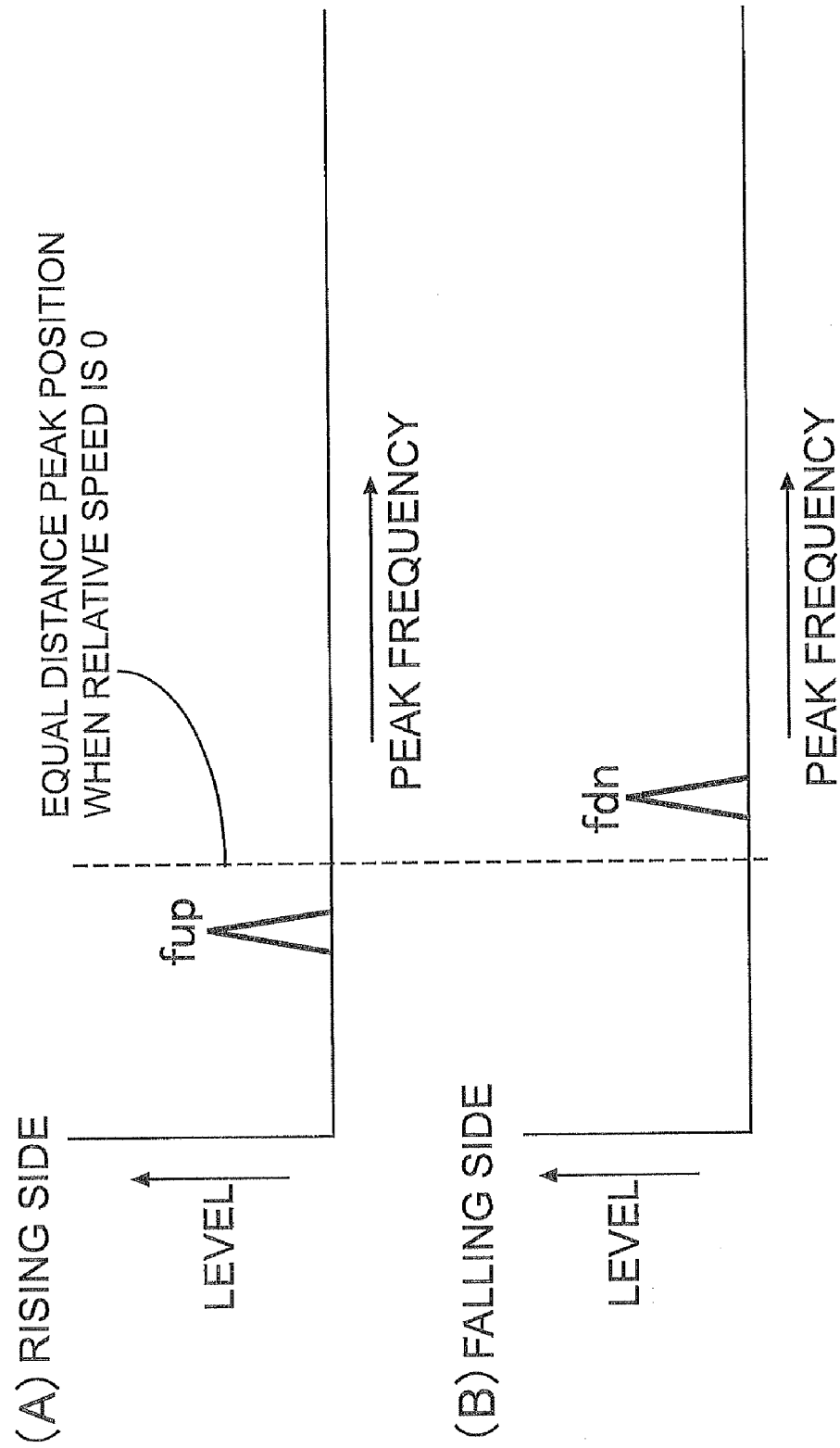
FIG. 4 is a diagram showing peak signals detected by peak signal detection means. (first embodiment)

The peak signal detection means M4 includes a rising side beat memory M4a and a falling side beat memory M4b, the rising side beat memory M4a storing the rising side peak frequency fup (see FIG. 4 (A)), and the falling side beat memory M4b storing the falling side peak frequency fdn (see FIG. 4 (B)).

The functions of the peak signal detection means M4, the current candidate memory (object candidate information storage means) M5, the field memory M6, the field grouping means (grouping means) M7, the field pairing means (object information calculation means) M8, and the current output memory M9 are explained below by reference to the flowcharts.

Figure 5:
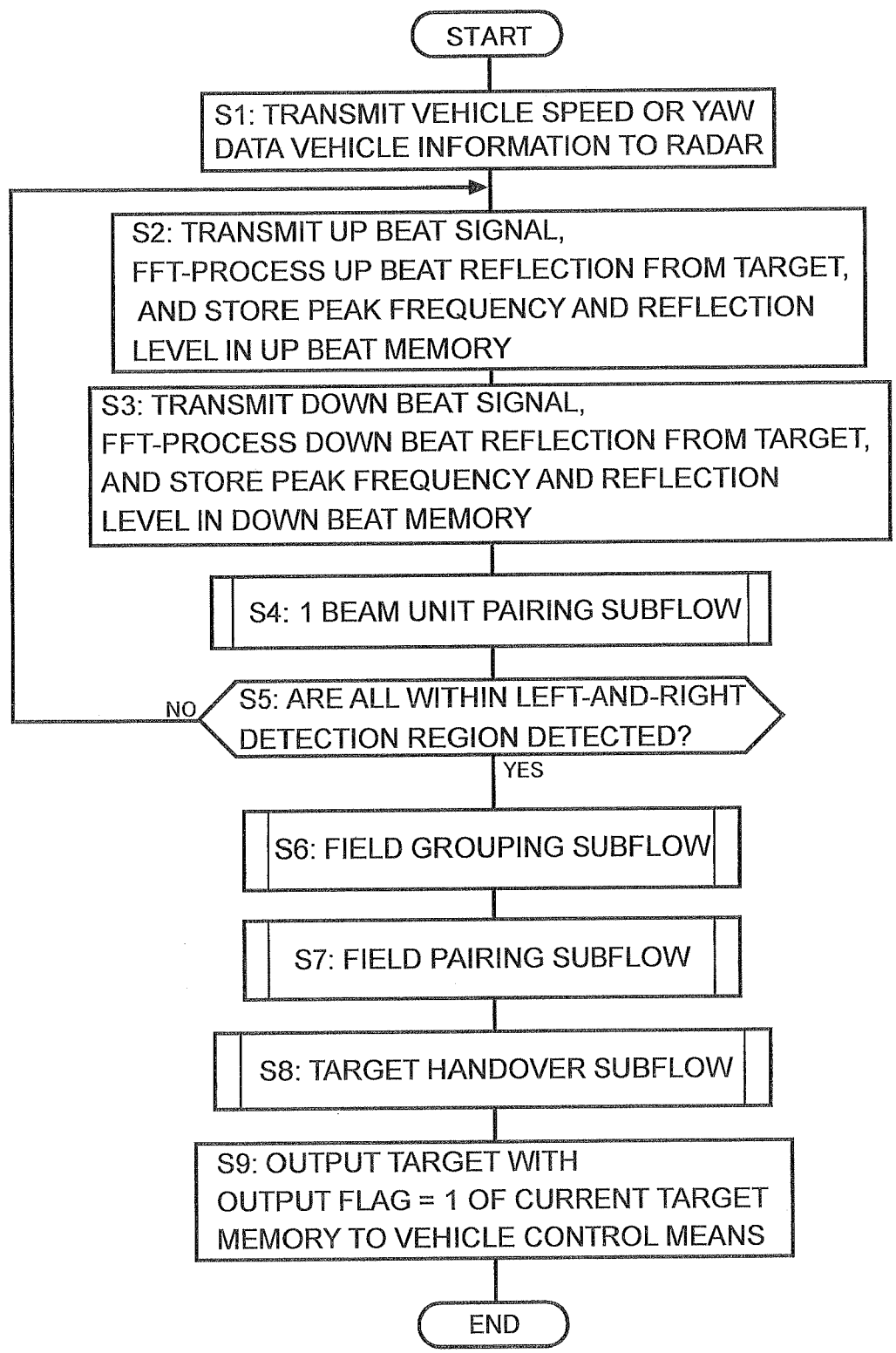
FIG. 5 is a flowchart of a main routine. (first embodiment)

In step S1 of the flowchart of the main routine in FIG. 5, the vehicle state determining means M2 detects a vehicle speed and a yaw rate and transmits them to the radar device R, in step S2 an up beat reflection of the up beat signal, transmitted from the transceiving means M1, reflected from the object is subjected to FFT (fast Fourier transform) and its rising side peak frequency and reflection level are stored in the up beat memory M4a of the peak signal detection means M4, in step S3 a down beat reflection of the down beat signal, transmitted from the transceiving means M1, reflected from the object is subjected to FFT (fast Fourier transform) and its falling side peak frequency and reflection level are stored in the down beat memory M4b of the peak signal detection means M4, and in the subsequent step S4 pairing processing of 1 beam unit is carried out by the peak signal detection means M4. In step S5 steps S2 to S4 are repeated until processing of all 16 beams within a detection region of 16° to the left and to the right is completed.

In the subsequent step S6 the field grouping means (grouping means) M7 carries out field grouping processing, in step S7 the field pairing means (object information calculation means) M8 carries out field pairing processing, in step S8 target handover processing is carried out, and following this in step S9 a target with output flag=1 in the current output memory M9 is outputted to the vehicle control means M10, and automatic braking, etc. for intervehicle distance control or collision damage mitigation control is carried out.

Figure 6:
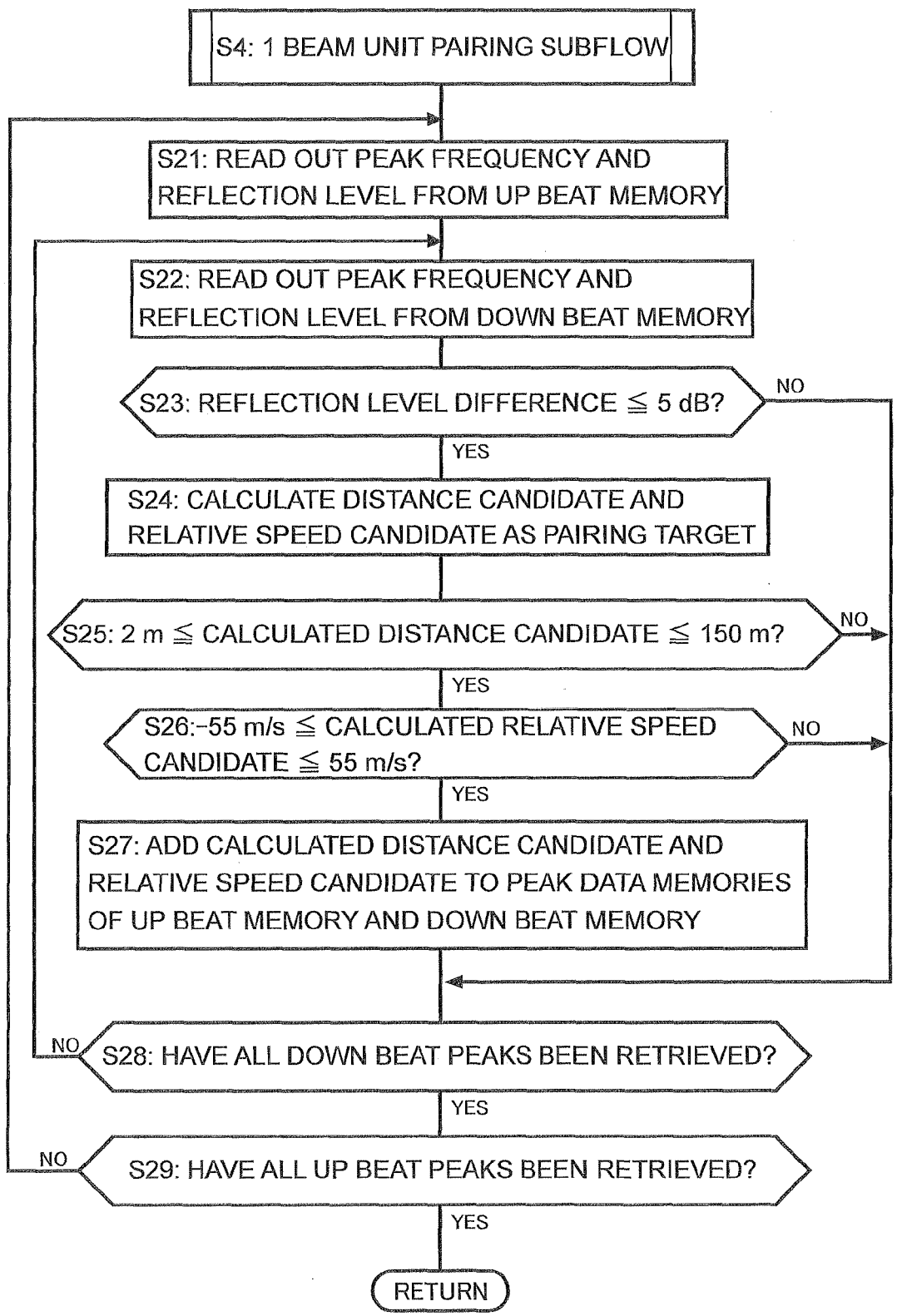
FIG. 6 is a flowchart of a subroutine of step S4 in the main routine. (first embodiment)

The specific contents of a '1 beam unit pairing subflow' of step S4 are now explained by reference to FIG. 6.

First, in step S21 the peak frequency and reflection level of the up beat peak signal are read out from the up beat memory M4a, and in step S22 the peak frequency and reflection level of the down beat peak signal are read out from the down beat memory M4b. In the subsequent step S23, if the difference between the reflection level of the up beat peak signal and the reflection level of the down beat peak signal is no greater than 5 dB, it is determined that the possibility that they are reflected waves from the same object is high, and in step S24 the up beat peak signal and the down beat peak signal are made targets for pairing, and a distance candidate and a relative speed candidate are calculated from the pair.

If in the subsequent step S25 the distance candidate is at least 2 m but no greater than 150 m, and in step S26 the relative speed candidate is at least −55 m/sec but no greater than 55 m/sec, in step S27 data of both the distance candidate and the relative speed candidate are added to the up beat memory M4a and the down beat memory M4b respectively.

The reason why those with a difference between the reflection level of the up beat peak signal and the reflection level of the down beat peak signal of no greater than 5 dB are selected is because if the difference in reflection level exceeds 5 dB the possibility that they are reflected waves from different objects is high. The reason why those for which a distance candidate is at least 2 m but no greater than 150 m is selected is because the subject vehicle does not come close to an object by a distance of less than 2 m, and the distance from the object does not exceed 150 m, which is larger than the distance (about 100 m) detectable by the radar device R. The reason why those for which a relative speed candidate of at least −55 m/sec but no greater than 55 m/sec is selected is because the absolute value for the relative speed between the subject vehicle and an object does not exceed 55 m/sec (about 200 km/h).

In step S28 the above steps S22 to S27 are repeated until all of the down beat peaks are retrieved, and in step S29 the above steps S21 to S28 are repeated until all of the up beat peaks are retrieved.

Figure 7:
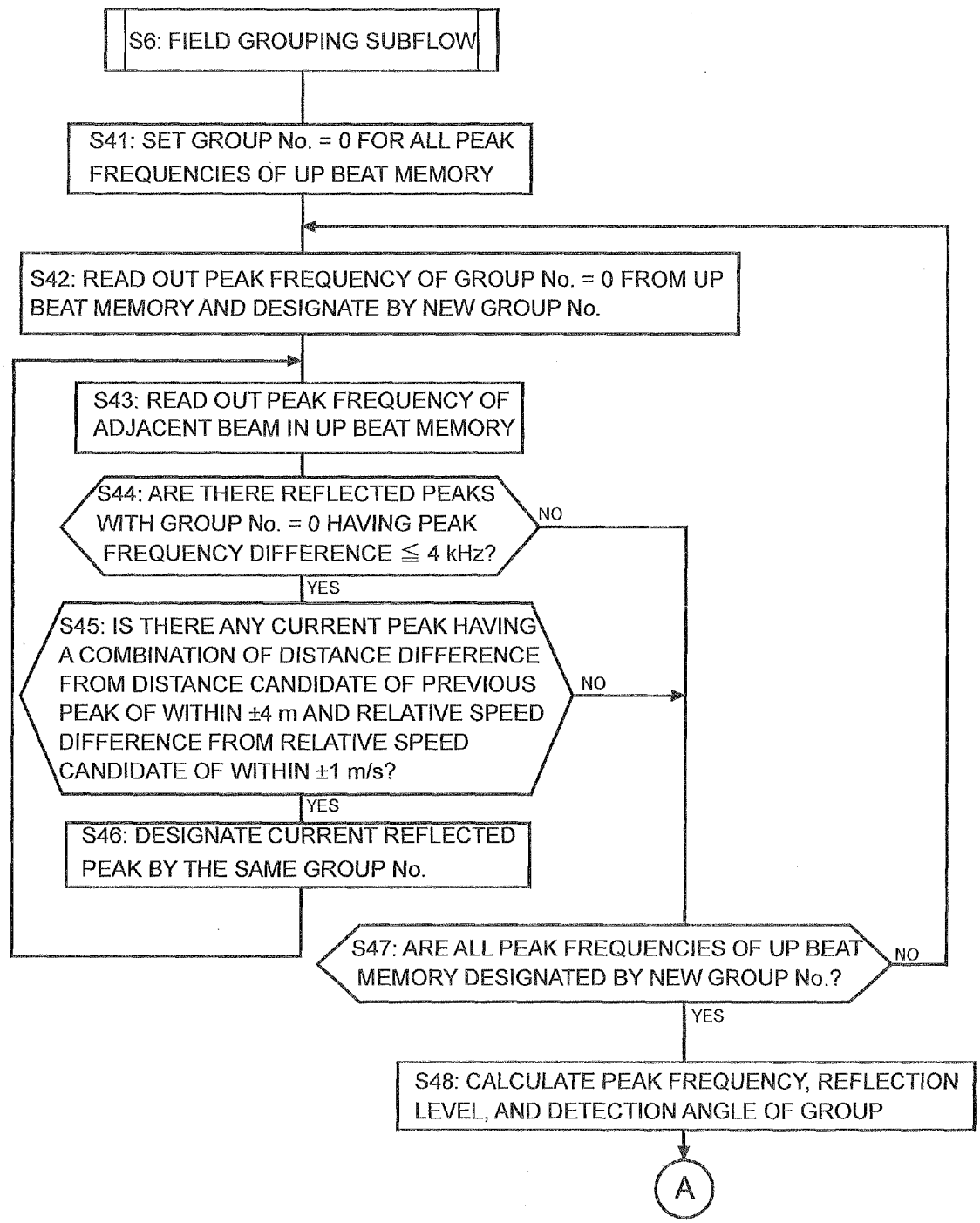
FIG. 7 is a flowchart of a subroutine of step S6 in the main routine (first partial diagram). (first embodiment)
Figure 8:
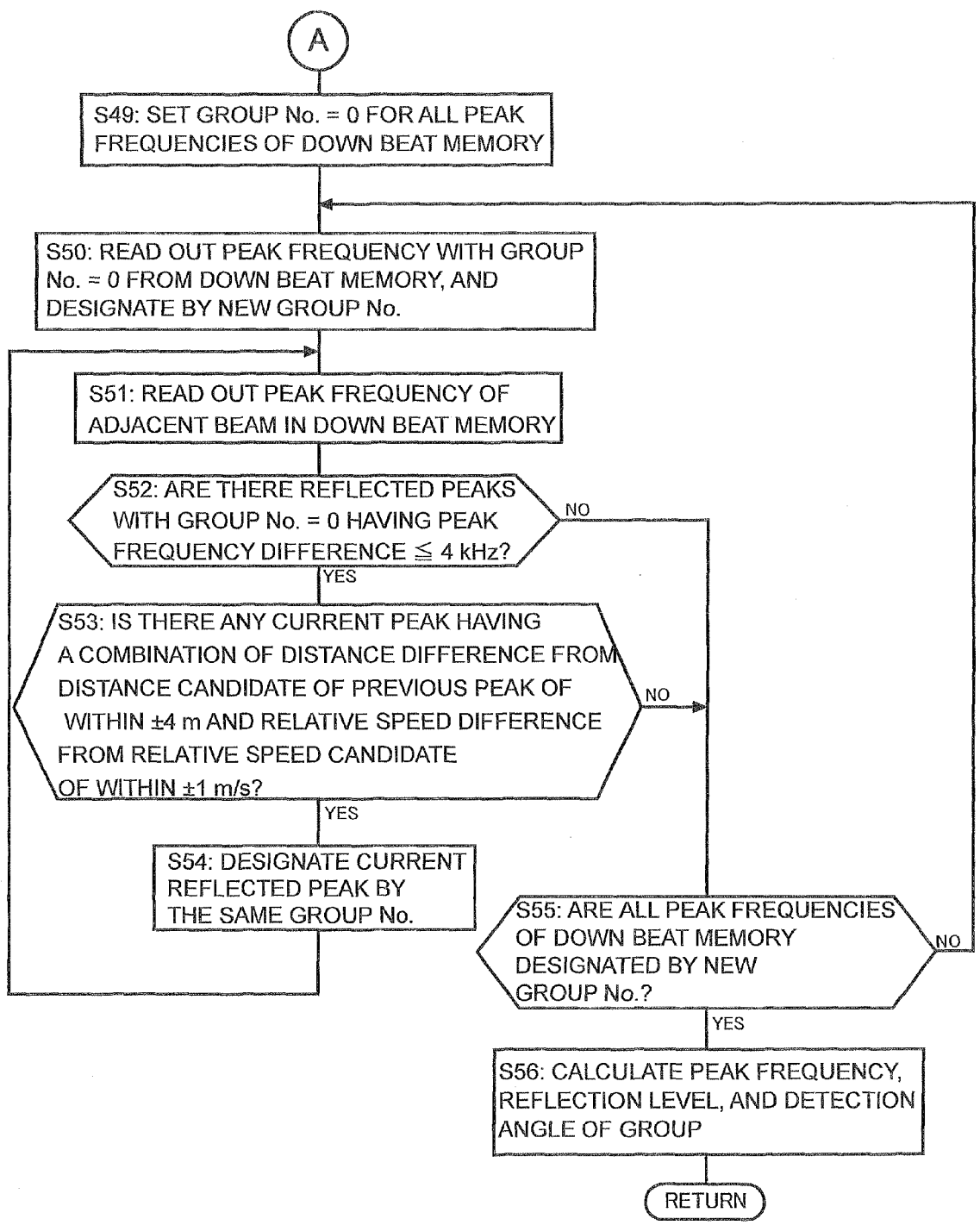
FIG. 8 is a flowchart of a subroutine of step S6 in the main routine (second partial diagram). (first embodiment)

The specific contents of a 'field grouping subflow' of step S6 are now explained based on FIG. 7 and FIG. 8.

First, in step S41 the group number for the frequencies of all of the up beat peaks stored in the up beat memory M4a is set to 0, in step S42 the peak frequencies of group number=0 are read out from the up beat memory M4a, and they are designated by new group numbers from 1 in sequence. In the subsequent step S43, the peak frequency of an adjacent beam in the up beat memory M4a is read out, and if in step S44 there is a reflected peak with group number=0 and an up beat peak and down beat peak difference in frequency of no greater than 4 kHz, and in step S45 there is a current peak that satisfies a combination of a difference in distance from a distance candidate of the previous peak being within ±4 m and a difference in relative speed from the relative speed candidate being within ±1 m/sec, then in step S46 the current reflected peak is designated by the same group number.

When the answer in step S44 is NO, or when the answer in step S45 is NO, in step S47 the above steps S42 to S46 are repeated until all of the peak frequencies of the up beat memory M4a are designated by new group numbers. In step S48 the peak frequency, reflection level, and detection angle of each group are calculated.

Processing of data of the down beat memory M4b in the subsequent steps S49 to S56 is substantially the same as the above-mentioned processing of data of the up beat memory M4a, and explanation thereof is omitted to avoid duplication.

Figure 9:
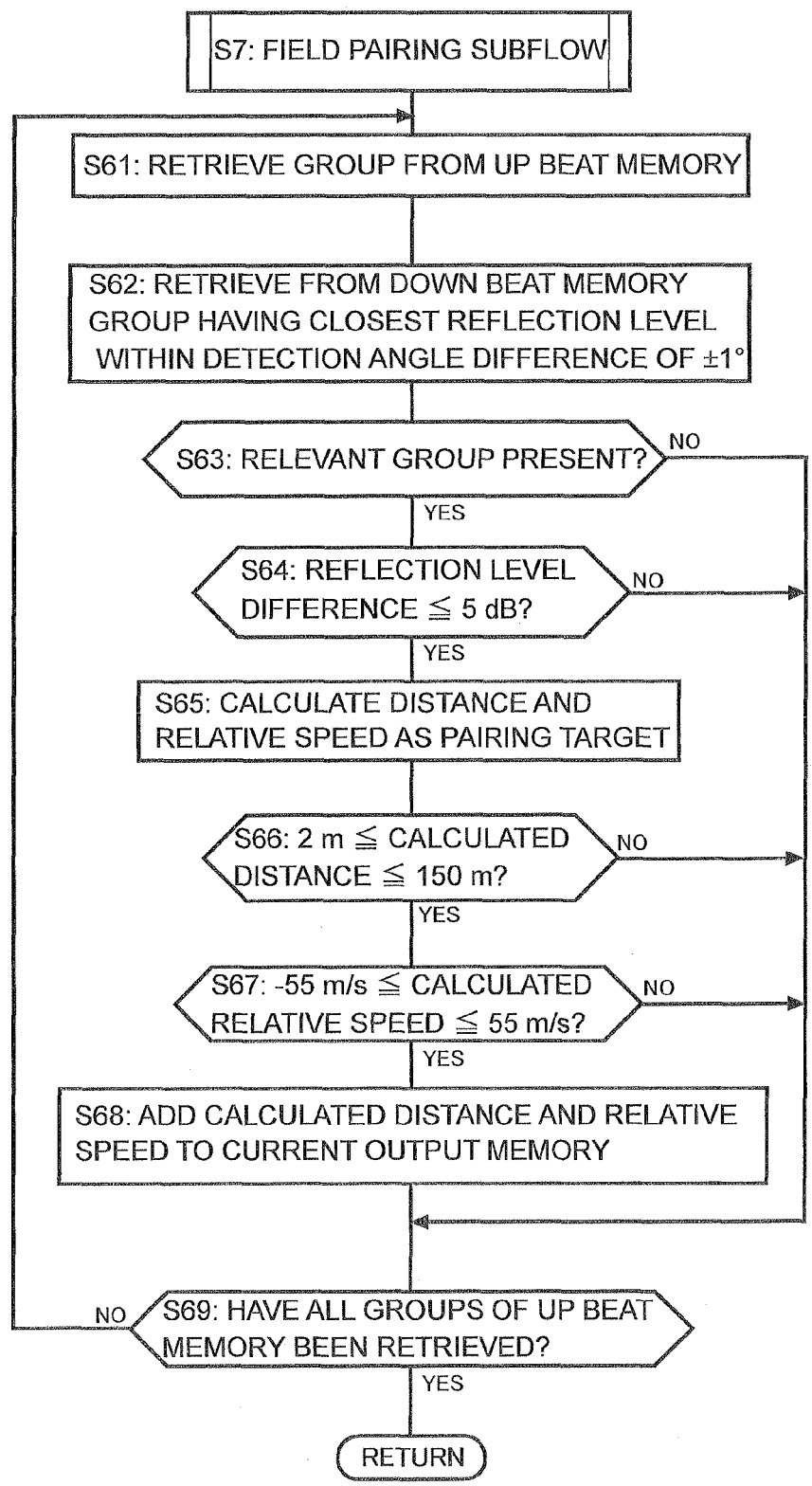
FIG. 9 is a flowchart of a subroutine of step S7 in the main routine. (first embodiment)

The specific contents of a 'field pairing subflow' of the above step S7 are now explained by reference to FIG. 9.

First, in step S61 a group is retrieved from the up beat memory M4a, and in step S62 a group for which the difference in detection angle is within ±1° and the reflection level is the closest is retrieved from the down beat memory M4b. If in the subsequent step S63 the relevant group is present, and in step S64 the difference in reflection level is no greater than 5 dB, in step S65 a distance and a relative speed are calculated as a pairing target. If in the subsequent step S66 the calculated distance is at least 2 m but no greater than 150 m and in step S67 the calculated relative speed is at least −55 m/sec but no greater than 55 m/sec, in step S68 the calculated distance and relative speed are added to the current output memory M9. In step S69 the above steps S61 to S68 are repeated until all of the groups of the up beat memory M4a are retrieved.

Figure 10:
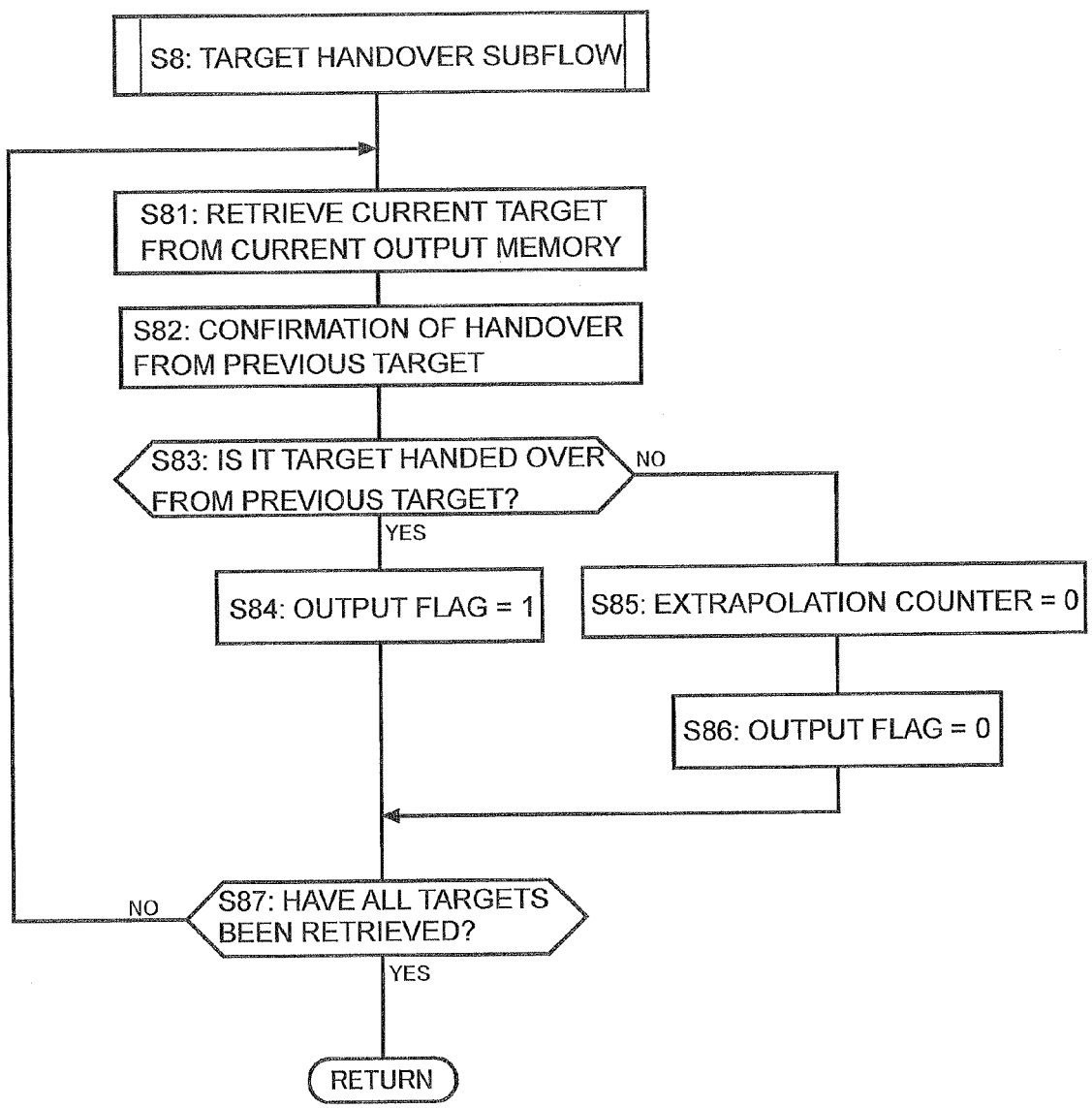
FIG. 10 is a flowchart of a subroutine of step S8 in the main routine. (first embodiment)

The specific contents of a 'target handover subflow' of the step S8 are now explained by reference to FIG. 10.

First, in step S81 the current target is read out from the current output memory M9, and in step S82 handover from the previous target is confirmed. Confirmation of handover between the previous target and the current target is carried out as follows. That is, the position of the current target is predicted from the position and the relative speed of the previous target; if the position of the target that is currently actually detected is within a predetermined range centered on the predicted position, it is determined that the current target is handed over from the previous target (that is, it is the same target), and if it is not within the predetermined range, it is determined that the current target is a newly detected target.

If in the subsequent step S83 the current target is one that has been handed over from the previous target, in step S84 an output flag is set to 1, and if the current target is not one that has been handed over from the previous target, in step S85 an extrapolation counter is set to 0, and in step S86 the output flag is reset to 0. In step S87 the above steps S81 to S86 are repeated until all of the targets are retrieved.

Extrapolation processing employing the extrapolation counter is processing in which a target that cannot be detected any more is regarded as still being detected, a predicted position of the target that cannot be detected is calculated at every cycle time, and when detection cannot be carried out 6 times in succession, that is, when the count value of the extrapolation counter becomes 6, the target being lost is established for the first time.

The contents of the above-mentioned flowcharts are now explained further by reference to specific examples.

FIG. 11 shows a state in which a preceding vehicle running at a speed of 30 m/sec is present 40 m in front of a subject vehicle running at a speed of 30 m/sec, and an adjacent lane vehicle running at a speed of 5 m/sec is present in the left adjacent lane 65 m in front of the subject vehicle. Furthermore, roadside objects such as poles are present on opposite sides of the road at fixed intervals. The radar device R mounted on the subject vehicle scans a fan-shaped detection region of 16° to the left and to the right with 16 beams having a detection area of 1° to the left and to the right, but in the drawing only 8 beams in the middle (beam 1 to beam 8) are shown for simplification.

Beam 1 detects a roadside object (3), beam 2 detects the adjacent lane vehicle (2) and a roadside object (4), beam 3 detects the preceding vehicle (1) and the adjacent lane vehicle (2), beam 4 detects the preceding vehicle (1), beam 5 detects the preceding vehicle (1), a roadside object (6), and a roadside object (7), beam 6 detects a roadside object (5) and the roadside object (6), beam 7 detects the roadside object (5), and beam 8 does not detect anything.

TABLE 1

| Group No. | Target No. | Distance | Relative speed |
|---|---|---|---|
| G (1) | T (1) | 40 m | 0 m/s |
| G (2) | T (2) | 65 m | −25 m/s |
| G (3) | T (3) | 65 m | −30 m/s |
| G (4) | T (4) | 90 m | −30 m/s |
| G (5) | T (5) | 40 m | −30 m/s |
| G (6) | T (6) | 65 m | −30 m/s |
| G (7) | T (7) | 90 m | −30 m/s |

Table 1 shows the distances and the relative speeds of the preceding vehicle (1), the adjacent lane vehicle (2), and the roadside objects (3) to (7). In Table 1, targets T (1) to T (7) correspond to the preceding vehicle (1), the adjacent lane vehicle (2), and the roadside objects (3) to (7).

In accordance with the above-mentioned positioning of the preceding vehicle (1), the adjacent lane vehicle (2), and the roadside objects (3) to (7), the up beat signals and down beat signals shown in FIG. 11 are obtained. It is notable here that up beat signals due to the preceding vehicle (1) and the adjacent lane vehicle (2) for beam 3 are superimposed on one another.

Figure 12:
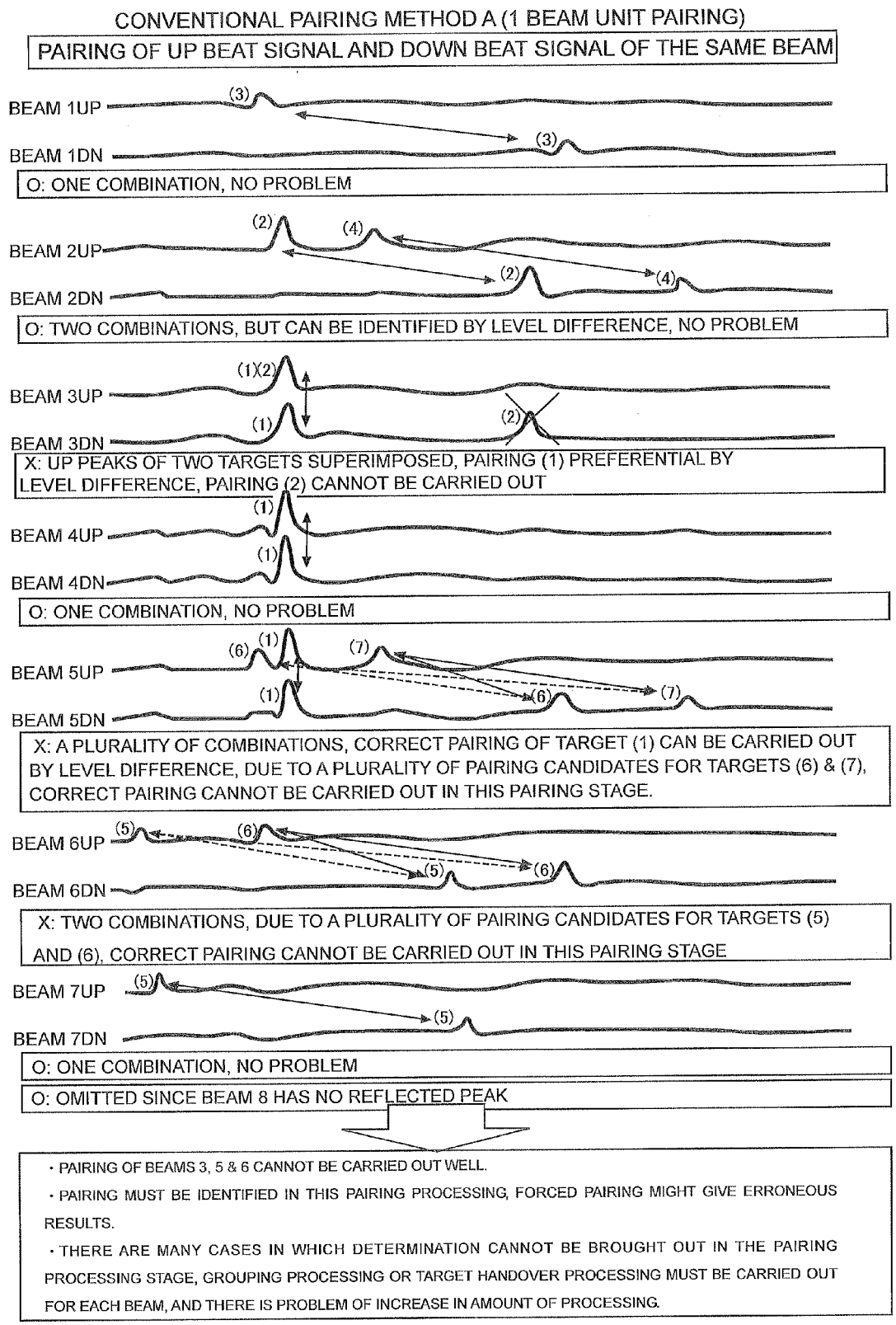
FIG. 12 is a diagram for explaining a conventional 1 beam unit pairing method. (first embodiment)

Here, a case in which conventional pairing method A (1 beam unit pairing) is applied to the state of FIG. 11 is explained by reference to FIG. 12. 1 beam unit pairing calculates a distance and relative speed of one object by collecting together those having similar distance and relative speed as a result of carrying out pairing for each beam unit.

With regard to beam 1, there is only one way of pairing of up beat peak and down beat peak, and based on the pairing the distance and relative speed of the roadside object (3) can be calculated.

With regard to beam 2, there are 4 ways of pairing for up beat peak and down beat peak, but due to there being a difference in reflection level, pairing of the up beat peak and down beat peak for the adjacent lane vehicle (2) can be identified and pairing of the up beat peak and down beat peak for the roadside object (4) can be identified, and the distances and relative speeds of the adjacent lane vehicle (2) and the roadside object (4) can therefore be calculated.

With regard to beam 3, up beat peaks of the preceding vehicle (1) and the adjacent lane vehicle (2) are superimposed on one another, and since the up beat peak and the down beat peak of the preceding vehicle (1) are paired based on the reflection level, there is the problem that pairing of the down beat peak of the adjacent lane vehicle (2) becomes impossible.

With regard to beam 4, there is only one way of pairing of up beat peak and down beat peak, and the distance and relative speed of the preceding vehicle (1) can be calculated based on the pairing.

With regard to beam 5, a plurality of ways of pairing the three up beat peaks and three down beat peaks can be considered; among them, pairing of the up beat peak and down beat peak of the preceding vehicle (1) can be identified based on the reflection level, but there is the problem that pairing of the up beat peaks and down beat peaks of the roadside objects (6) and (7) cannot be identified since there is no apparent difference in reflection level.

With regard to beam 6, four ways of pairing of up beat peaks and down beat peaks of the roadside objects (6) and (7) can be considered, but there is the problem that identification thereof is impossible since there is no apparent difference in reflection level.

With regard to beam 7, there is only one way of pairing of up beat peak and down beat peak, and based on this combination the distance and relative speed of the roadside object (5) can be calculated.

With regard to beam 8, there is no up beat peak or down beat peak, and no object is detected.

As hereinbefore described, in the conventional 1 beam pairing, pairing for beams 3, 5, and 6 cannot be carried out well, and if a forced pairing is identified by this processing, an erroneous result might be obtained. Furthermore, if an attempt is made to complete pairing in a downstream step, it becomes necessary to carry out grouping processing or target handover processing for each beam, the amount of arithmetic processing becomes enormous, and completion within a predetermined cycle time becomes impossible, which is a problem.

A case in which conventional pairing method B (field pairing) is applied to the state of FIG. 11 is now explained by reference to FIG. 13. Field pairing is carried out by collecting together for all the up beat peaks those having similar frequencies and those having similar detection angles, collecting together for all the down beat peaks those having similar frequencies and those having similar detection angles, and pairing the frequencies of the collected reflected peaks of the two.

When collecting those having similar frequencies and those having similar left-and-right direction angles for the up beat peaks and the down beat peaks, among the 7 groups, that is, group (1) to group (7) corresponding to the 7 objects, that is, objects (1) to (7), group (3) to group (7) can be subjected to correct pairing by comparing detection angle, reflection level, and distance and relative speed after pairing. However, with regard to beam 3UP of the group (1) UP of the up beat peak, although data of the preceding vehicle (1) are blended with data of the adjacent lane vehicle (2), pairing of group (1) UP with group (1) DN has precedence, there is no partner for pairing with group (2) DN, and pairing thereof becomes impossible, which is a problem.

A case in which the pairing method of the present embodiment (combination of 1 beam pairing and field pairing) is applied to the state of FIG. 11 is now explained by reference to FIG. 14 and FIG. 15. Pairing of the present embodiment involves first pairing with respect to 1 beam unit, and storing for each reflected peak a pairing combination (can be a plurality thereof) that has a possibility of being outputted as a target. Subsequently, reflected peaks for which the peak frequency is within a predetermined range and beams are adjacent to each other are collected into one group, it is checked at this point that they have the same pairing combination from 1 beam unit pairing information (distance or relative speed) possessed by each reflected peak, and when they have the same combination they are made into one group. Pairing between the up beat peak group and the down beat peak group is carried out, and the distance or relative speed of the group (that is, the object) is calculated.

Figure 14:
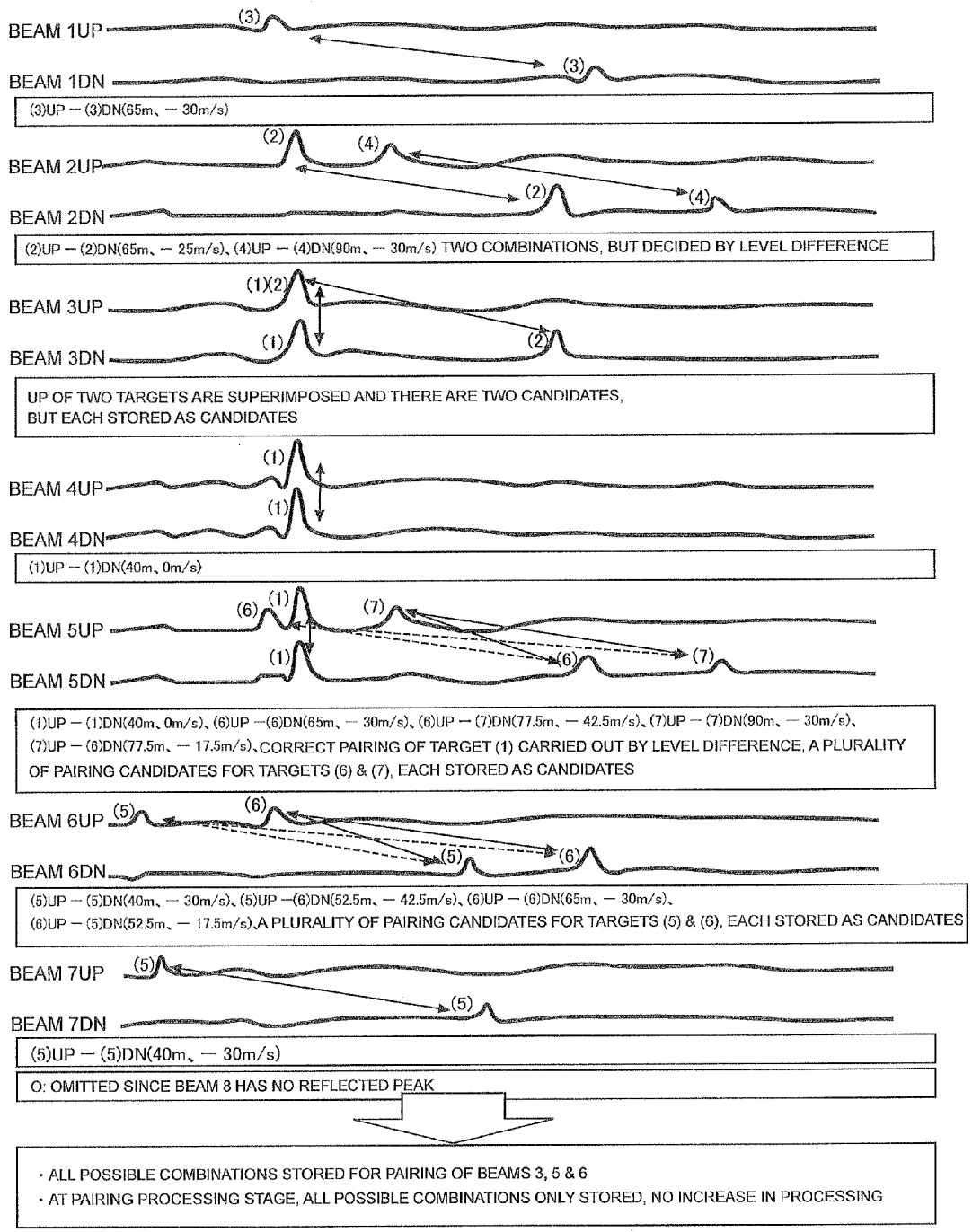
FIG. 14 is a diagram for explaining the pairing method of the embodiment (first partial diagram). (first embodiment)

First, in FIG. 14, with regard to beam 1, there is only one way of pairing of up beat peak and down beat peak, and based on the pairing the distance (65 m) and relative speed (−30 m/s) of the roadside object (3) can be calculated.

With regard to beam 2, there are 4 ways of pairing of up beat peak and down beat peak, but by a difference in reflection level being present pairing of the up beat peak and down beat peak of the adjacent lane vehicle (2) is identified and the distance (65 m) and relative speed (−25 m/s) are calculated, and pairing of the up beat peak and down beat peak of the roadside object (4) is identified and the distance (90 m) and relative speed (−30 m/s) are calculated.

With regard to beam 3, up beat peaks of the preceding vehicle (1) and the adjacent lane vehicle (2) are superimposed on one another, and since a pairing candidate (40 m, 0 m/s) of peak (1) (2) UP and peak (1) DN and a pairing candidate (65 m, −25 m/s) of peak (1) (2) UP and peak (2) DN are present, data for distance and relative speed of the two pairing candidates are stored.

With regard to beam 4, there is only one way of pairing of up beat peak and down beat peak, and based on the pairing the distance (40 m) and relative speed (0 m/s) of the preceding vehicle (1) can be calculated.

With regard to beam 5, a plurality of ways of pairing the three up beat peaks and three down beat peaks can be considered; among them, pairing of the up beat peak and down beat peak of the preceding vehicle (1) can be identified based on the reflection level, and based on the pairing, the distance (40 m) and relative speed (0 m/s) of the preceding vehicle (1) can be calculated. Since pairing of up beat peaks and down beat peaks of the remaining roadside objects (6) and (7) cannot be identified because there is no prominent difference in reflection level, data for the distance and the relative speed of possible pairing candidates, that is, four pairing candidates including the pairing candidate (65 m, −30 m/s) of peak (6) UP and peak (6) DN, the pairing candidate (77.5 m, −42.5 m/s) of peak (6) UP and peak (7) DN, the pairing candidate (90 m, −30 m/s) of peak (7) UP and peak (7) DN, and the pairing candidate (77.5 m, −17.5 m/s) of peak (7) UP and peak (6) DN are stored.

With regard to beam 6, four ways of pairing of up beat peaks and down beat peaks of the roadside objects (5) and (6) can be considered, but they cannot be identified since there is no prominent difference in reflection level, and data for the distance and the relative speed of possible pairing candidates, that is, four pairing candidates including the pairing candidate (40 m, −30 m/s) of peak (5) UP and peak (5) DN, the pairing candidate (52.5 m, −42.5 m/s) of peak (5) UP and peak (6) DN, the pairing candidate (65 m, −30 m/s) of peak (6) UP and peak (6) DN, and the pairing candidate (52.5 m, −17.5 m/s) of peak (6) UP and peak (5) DN are stored.

With regard to beam 7, there is only one way of pairing of up beat peak and down beat peak, and based on the combination thereof the distance (40 m) and relative speed (−30 m/s) of the roadside object (5) can be calculated.

With regard to beam 8, there is no up beat peak or down beat peak, and no object is detected.

As described above, in 1 beam unit pairing of the present embodiment, with regard to beams 3, 5, and 7, for which pairing cannot be identified, only possible pairings and data for the distance and the relative speed of the pairings are stored; final identification of pairing is not carried out, and the amount of arithmetic processing therefore does not increase.

With regard to beams 3, 5, and 6, for which pairing could not be identified by the 1 beam pairing explained by reference to FIG. 14, grouping of up beat peaks and down beat peaks is carried out by the field grouping shown in FIG. 15 by utilizing data for the distance and the relative speed of the above pairing candidates.

It is not clear whether the up beat peak (1) (2) of beam 3 is due to the preceding vehicle (1) or due to the adjacent lane vehicle (2), but since it is clear that the up beat peak (2) of beam 2, which is adjacent to beam 3, is due to the adjacent lane vehicle (2) (65 m, −25 m/s), and among data (40 m, 0 m/s) of the preceding vehicle (1) and data (65 m, −25 m/s) of the adjacent lane vehicle (2), which are the two pairing candidates for up beat peak (1) (2), data (40 m, 0 m/s) of the preceding vehicle (1) do not coincide but data (65 m, −25 m/s) of the adjacent lane vehicle (2) coincide, it is clear that the up beat peak (1) (2) of beam 3 is up beat peak (2), and the up beat peak (2) of beam 3 is collected with the up beat peak (2) of beam 2 and thus grouped as group (2).

As a result, up beat peak (1) of beam 4 and up beat peak (1) of beam 5 are separated from the group (2) of beam 2 and beam 3, and grouped as group (1).

Focusing on up beat peak (5) and down beat peak (5) of beam 6, there are two pairing candidates, that is, data (40 m, −30 m/s) and data (52.5 m, −42.5 m/s), and since data of the roadside object (5) identified by beam 7, which is adjacent to beam 6, are (40 m, −30 m/s), it is determined that up beat peak (5) and down beat peak (5) of beam 6 are due to the roadside object (5), up beat peak (5) of beam 6UP and up beat peak (5) of beam 7UP are grouped as group (5) UP, and down beat peak (5) of beam 6DN and down beat peak (5) of beam 7DN are grouped as group (5) DN.

Furthermore, focusing on up beat peak (6) and down beat peak (6) of beam 5 and beam 6, with regard to beam 5 there are two pairing candidates, that is, data (65 m, −30 m/s) and data (77.5 m, −42.5 m/s) and with regard to beam 6 there are two pairing candidates, that is, data (65 m, −30 m/s) and data (52.5 m, −17.5 m/s); pairing corresponding to the data (65 m, −30 m/s), which are common to the two, is identified, up beat peak (6) of beam 5UP and up beat peak (6) of beam 6UP are grouped as group (6) UP, and down beat peak (6) of beam 5DN and down beat peak (6) of beam 6DN are grouped as group (6) DN.

Furthermore, focusing on up beat peak (7) and down beat peak (7) of beam 5, since pairing of up beat peaks (1) and (6) and up beat peaks (1) and (6) of the same beam 5 has already been identified, up beat peak (7) and down beat peak (7) are paired, and group (7) UP and group (7) DN are identified.

When group (1) UP to group (7) UP of the up beat peaks and group (1) DN to group (7) DN of the down beat peaks are identified in this way, the distance and relative speed of the preceding vehicle (1), the adjacent lane vehicle (2), and the roadside objects (3) to (7) corresponding to these groups are identified.

As hereinbefore described, the current candidate memory (object candidate information storage means) M5 carries out pairing of peak signals on the rising side and the falling side, but since final calculation of distance or relative speed for an object is not carried out, the amount of arithmetic processing can be reduced, and since the field grouping means (grouping means) M7 carries out grouping based on object candidate information of peak signals stored in the current candidate memory (object candidate information storage means) M5, correct pairing can be carried out; as a result calculation of distance or relative speed for an object by the field pairing means (object information calculation means) M8 can be carried out with good precision using a small amount of arithmetic processing.

An embodiment of the present invention is explained above, but the present invention may be modified in a variety of ways as long as the modifications do not depart from the sprit and scope thereof.

For example, in the embodiment grouping is carried out using distance and relative speed, but grouping may be carried out using only one of distance and relative speed.

The invention claimed is:

1. An object detecting apparatus, comprising:
   a transceiver that transmits FM/CW waves toward a plurality of detection areas and receives a reflected wave of the transmitted FM/CW wave from an object;
   a frequency analyzer that generates a beat signal from the transmitted wave and the received wave of the transceiver and subjects the beat signal to frequency analysis;
   a peak signal detector that determines peak signals on the rising side and the falling side based on the results of the frequency analysis by the frequency analyzer; and
   an object candidate information storage device that stores as object candidate information a distance or a relative speed for an object determined based on a combination of peak signals on the rising side and the falling side of each detection area,
   wherein, when the difference in frequency between peak signal 1 determined in any detection area and peak signal 2 determined in another detection area is no greater than a predetermined value, and object candidate information relating to peak signal 1 and object candidate information relating to peak signal 2 stored in the object candidate information storage device are substantially equal to each other, the object detecting apparatus is configured to:
   group the two peak signals, and
   calculate the distance or relative speed of the object based on a combination of peak signals on the rising side and the falling side after the grouping processing.

2. The object detecting apparatus according to claim 1, wherein when there are a plurality of combinations of peak signals on the rising side and the falling side in each detection area, the object candidate information storage device stores as object candidate information a distance or a relative speed for the object determined based on each combination, and
   when there is common object candidate information shared among a plurality of sets of object candidate information relating to peak signal 1 and a plurality of sets of object candidate information relating to peak signal 2 stored in the object candidate information storage device, the object detecting apparatus is configured to group the two peak signals.

3. The object detecting apparatus according to claim 2, wherein when the distance of the object relating to peak signal 1 and the distance of the object relating to peak signal 2 stored in the object candidate information storage device means are substantially equal to each other, the object detecting apparatus is configured to determine that sets of object information calculated from the two peak signals are equal.

4. The object detecting apparatus according to claim 3, wherein when the relative speed relating to peak signal 1 and the relative speed relating to peak signal 2 stored in the object candidate information storage device are substantially equal to each other, the object detecting apparatus is configured to determine that sets of object information calculated by the two peak signals are equal.

5. The object detecting apparatus according to claim 2, wherein when the relative speed relating to peak signal 1 and the relative speed relating to peak signal 2 stored in the object candidate information storage device are substantially equal to each other, the object detecting apparatus is configured to determine that sets of object information calculated by the two peak signals are equal.

6. The object detecting apparatus according to claim 1, wherein when the distance of the object relating to peak signal 1 and the distance of the object relating to peak signal 2 stored in the object candidate information storage device are substantially equal to each other, the object detecting apparatus is configured to determine that sets of object information calculated from the two peak signals are equal.

7. The object detecting apparatus according to claim 6, wherein when the relative speed relating to peak signal 1 and the relative speed relating to peak signal 2 stored in the object candidate information storage device are substantially equal to each other, the object detecting apparatus is configured to determine that sets of object information calculated by the two peak signals are equal.

8. The object detecting apparatus according to claim 1, wherein when the relative speed relating to peak signal 1 and the relative speed relating to peak signal 2 stored in the object candidate information storage device are substantially equal to each other, the object detecting apparatus is configured to determine that sets of object information calculated by the two peak signals are equal.

* * * * *